US009641105B2

(12) United States Patent
Yang et al.

(10) Patent No.: US 9,641,105 B2
(45) Date of Patent: May 2, 2017

(54) MOBILE COMMUNICATION TERMINAL

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Jiuxia Yang, Beijing (CN); Jiaheng Wang, Beijing (CN); Feng Bai, Beijing (CN)

(73) Assignees: BOE Technology Group Co., Ltd., Beijing (CN); Beijing BOE Optoelectronics Technology Co., Ltd., Beijing (CN)

( * ) Notice: Subject to any disclaimer, the term of this patent is extended or adjusted under 35 U.S.C. 154(b) by 0 days.

(21) Appl. No.: 14/429,526

(22) PCT Filed: Aug. 1, 2014

(86) PCT No.: PCT/CN2014/083541
§ 371 (c)(1),
(2) Date: Mar. 19, 2015

(87) PCT Pub. No.: WO2015/090070
PCT Pub. Date: Jun. 25, 2015

(65) Prior Publication Data
US 2016/0020713 A1    Jan. 21, 2016

(30) Foreign Application Priority Data
Dec. 19, 2013  (CN) .......................... 2013 1 0705385

(51) Int. Cl.
H02N 2/18        (2006.01)
(52) U.S. Cl.
CPC .................... H02N 2/18 (2013.01)

(58) Field of Classification Search
CPC ..... H01L 41/00; H01L 41/04; H01L 41/0471; H01L 41/085
(Continued)

(56) References Cited
U.S. PATENT DOCUMENTS 5,126,618 A * 6/1992 Takahashi ............. H01L 41/083
310/328
5,888,187 A * 3/1999 Jaeger .................. A61B 5/0031
600/23

(Continued)

FOREIGN PATENT DOCUMENTS

CN       201369687 Y    12/2009
CN       101699744 A     4/2010
(Continued)

OTHER PUBLICATIONS

Second Chinese Office Action of Chinese Application No. 201310705385.7, mailed Nov. 6, 2015 with English translation.
International Search Report with Notice of Transmittal of the International Search Report of PCT/CN2014/083541 in Chinese, mailed Oct. 28, 2014.

(Continued)

Primary Examiner — Tuan Pham
(74) Attorney, Agent, or Firm — Collard & Roe, P.C.

(57)                ABSTRACT

A mobile communication terminal comprises an acoustic-electro conversion unit configured to convert sound into electric energy, which includes a conversion device for converting vibration into electric energy; and an energy storage unit electrically connected to the conversion device and configured to store electric energy generated by the conversion device. The mobile communication terminal can solve the problem that the mobile communication terminal has large power consumption and short continuous service time, and can make full use of energy, has a long continuous service time and is convenient to use.

6 Claims, 1 Drawing Sheet

(58) Field of Classification Search
USPC .................................. 455/66.1, 73, 575.1
See application file for complete search history.

(56) References Cited

U.S. PATENT DOCUMENTS

| | | | |
|---|---|---|---|
| 8,569,930 B2 | 10/2013 | Takahashi et al. | |
| 2007/0272482 A1* | 11/2007 | Yamaguchi | G10K 11/16 181/290 |
| 2009/0096326 A1 | 4/2009 | Onishi et al. | |
| 2011/0316100 A1* | 12/2011 | Kim | H04R 19/04 257/416 |
| 2013/0157729 A1* | 6/2013 | Tabe | H04W 52/0245 455/573 |
| 2013/0257551 A1* | 10/2013 | Onishi | H04R 17/005 331/155 |

FOREIGN PATENT DOCUMENTS

| | | |
|---|---|---|
| CN | 102097853 A | 6/2011 |
| CN | 102170176 A | 8/2011 |
| CN | 102460938 A | 5/2012 |
| CN | 202840630 U | 3/2013 |
| CN | 203225880 U | 10/2013 |
| CN | 103701361 A | 4/2014 |

OTHER PUBLICATIONS

Written Opinion of the International Searching Authority of PCT/CN2014/083541 in Chinese with English translation mailed Oct. 28, 2014.

Chinese Office Action of Chinese Application No. 201310705385.7, mailed May 6, 2015 with English translation.

\* cited by examiner

MOBILE COMMUNICATION TERMINAL

CROSS REFERENCE TO RELATED APPLICATIONS

This application is the National Stage of PCT/CN2014/083541 filed on Aug. 1, 2014, which claims priority under 35 U.S.C. §119 of Chinese Application No. 201310705385.7 filed on Dec. 19, 2013, the disclosure of which is incorporated by reference.

TECHNICAL FIELD

The present disclosure relates to a mobile communication terminal.

BACKGROUND

With the development of technologies, mobile communication terminals (such as cell phones, tablet computers, and so on) have had very broad applications now.

Because mobile communication terminals are all powered by batteries, their continuous service time is limited. When the battery is used up, it has to be charged. However, frequent charging operations affect the user's normal usage. If the user forgets to charge the device, the problem that the device is not usable may be caused.

In particular, with the popularization of smart phones, the above problems become more notable. Because the smart phones have larger power consumption though they have more functions, while the energy storage capacity of batteries cannot be increased unlimitedly, the smart phones have shorter continuous service time. Usually, many smart phones need to be charged every one or two days, which degrades users' usage experience dramatically.

SUMMARY

In view of the problems of large power consumption and short continuous service time in the existing mobile communication terminal, there is provided a mobile communication terminal that can make full use of energy and has a long continuous service time.

According to one aspect of the present disclosure, there is provided a mobile communication terminal, comprising: an acoustic-electro conversion unit configured to convert sound into electric energy, which includes a conversion device for converting vibration into electric energy; and an energy storage unit electrically connected to the conversion device, and configured to store electric energy generated by the conversion device.

In one exemplary embodiment, the conversion device comprises a piezoelectric ceramic thin film.

In another exemplary embodiment, the conversion device comprises a plurality of superposed piezoelectric ceramic thin films In one exemplary embodiment, the conversion device comprises a magnetic strain alloy thin film.

In another exemplary embodiment, the magnetic strain alloy thin film is a ferro-cobalt alloy thin film or an ferro-gallium alloy thin film In one exemplary embodiment, the acoustic-electro conversion unit further comprises a sound collection device configured to collect outside sound.

In another exemplary embodiment, the sound collection device comprises a sound collection board having a plurality of through holes. The through holes on the sound collection board present a network distribution.

In one exemplary embodiment, the acoustic-electro conversion unit further comprises a conduction device configured to generate vibration under the action of sound and conduct the vibration to the conversion device.

In another exemplary embodiment, the conduction device is a multi-hole sound-absorbing layer that is in contact with the conversion device.

Alternatively, the mobile communication terminal is a mobile phone.

In one exemplary embodiment, the acoustic-electro conversion unit is arranged on back cover of the mobile phone.

Since the mobile communication terminal of the present disclosure has the acoustic-electro conversion unit, it can absorb outside sound at any time and convert the sound into the electric energy to provide power supply for the mobile communication terminal. Therefore, the mobile communication terminal of the present disclosure can make full use of energy, has a long continuous service time, and is convenient to use.

DETAILED DESCRIPTION

In order to facilitate those skilled in the art to understand the technical solution of the present disclosure better, the specific implementations of the present disclosure will be further described in detail by combining with the figures.

First Embodiment

Figure 1:
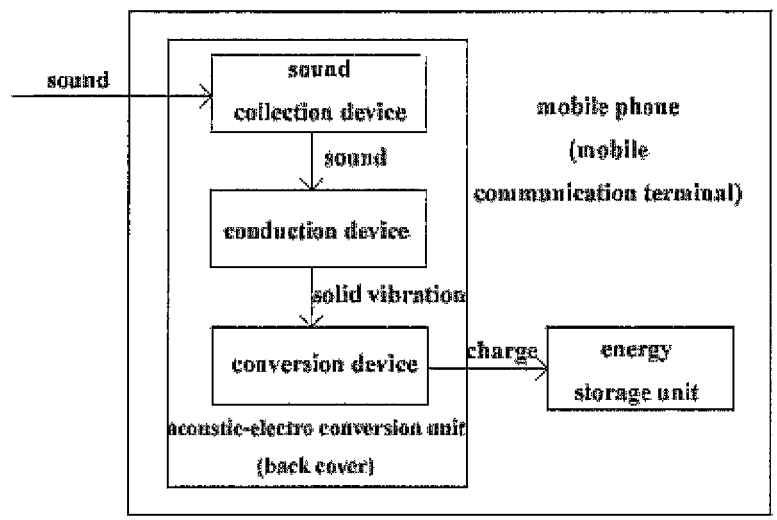
FIG. 1 is a schematic block chart of a configuration of a mobile communication terminal according to a first embodiment of the present disclosure.

FIG. 1 illustrates a schematic block chart of a configuration of a mobile communication terminal according to a first embodiment of the present disclosure. As shown in FIG. 1, there is provided a mobile communication terminal in the first embodiment. For example, the mobile communication terminal can be a mobile phone. The present embodiment is described .by taking the mobile phone as an example of the mobile communication terminal. However, it should be understood that the mobile communication terminal can also be other mobile apparatus having communication function, such as a tablet computer and so on.

The mobile communication terminal as shown in FIG. 1 comprises known components such as a display panel, a loudspeaker, a microphone, a processor, a circuit board, a housing, and keys and so on. In addition, it further comprises an acoustic-electro conversion unit and an energy storage unit.

The acoustic-electro conversion unit is configured to convert sound into electric energy and includes a conversion device 1 for converting vibration into electric energy.

The energy storage unit is electrically connected to the conversion device 1 and used to store the electric energy generated by the conversion device 1, and can be used to provide power supply for other components of the mobile phone (such as a processor, a display panel and a loudspeaker, etc.) by using the stored electric energy.

In other words, the mobile communication terminal of the present embodiment can convert sound (noise in the environment, phone call voice, etc.) into electric energy through the acoustic-electro conversion unit, and stores the electric energy in the energy storage unit, so as to provide a part of required energy for the operation of the mobile communication terminal, which can both make full use of energy and prolong the continuous service time of the mobile phone.

Herein, the energy storage can be the original battery of the mobile communication terminal, that is, the sound-electric conversion unit can charge the battery at any time.

Alternatively, the energy storage unit can be an additional auxiliary battery, that is, the mobile communication terminal is mainly powered by the original battery, while as a supplementary, the auxiliary battery provides power supply or provides power supply for a part of components with relatively low power consumption when the level of the original battery is insufficient.

Figure 2:
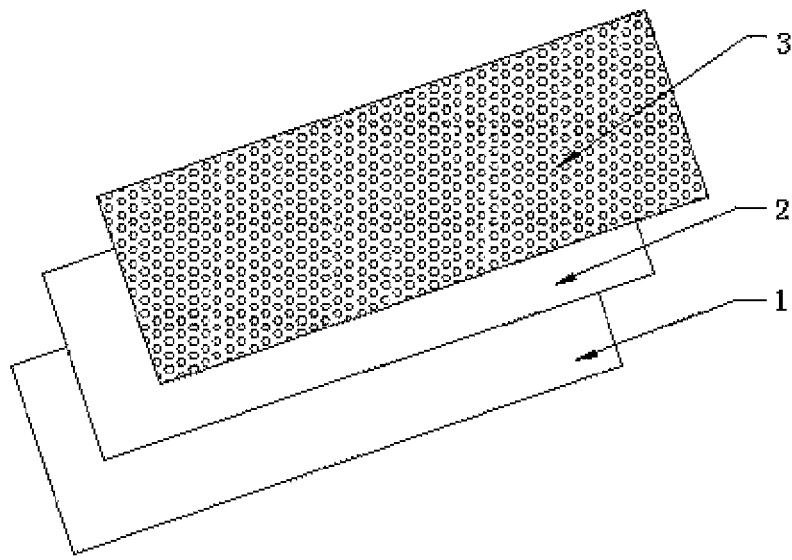
FIG. 2 is a schematic diagram of a configuration of an acoustic-electro conversion unit of a mobile communication terminal according to the first embodiment of the present disclosure.

FIG. 2 illustrates a schematic diagram of a configuration of an acoustic-electro conversion unit of a mobile communication terminal according to the first embodiment of the present disclosure. For example, as one mode of the present embodiment, the conversion device 1 comprises a piezoelectric ceramic thin film, and can also comprise a plurality of superposed piezoelectric ceramic thin films.

Piezoelectric ceramics is a known material that can generate an electrical signal under pressure. The common piezoelectric ceramics comprises barium titanate ceramics, and lead zirconate titanate ceramics and so on. Since the essence of sound is vibration, it will generate pressure on the piezoelectric ceramic thin film in the process of vibration, so that the piezoelectric ceramic thin film can convert this pressure into the electric energy. In view of making full use of energy, a monolayer piezoelectric ceramic thin film cannot fully absorb all the vibration energy in some cases. Therefore, a plurality of superposed piezoelectric ceramic thin films for example, can be used as the conversion device 1, so as to raise the efficiency of generating electricity.

The piezoelectric ceramic thin film can be attached to the mobile communication terminal after being prepared by sintering approach; or the piezoelectric ceramic thin film can be directly formed on the mobile communication terminal by coating process and thermo-hardening process.

For example, as another implementation of the present embodiment, the conversion device 1 can comprise a magnetic strain alloy thin film. Alternatively, the magnetic strain alloy thin film is a ferro-cobalt alloy thin film or a Ferro-gallium alloy thin film.

The magnetic strain alloy is a known material in the field of "generating electricity by vibration". Generating electricity by vibration is an electricity generation manner of converting mechanical energy of vibration into electric energy. The efficiency of generating electricity by vibration through the magnetic strain alloy is generally much higher than the efficiency of generating electricity through the piezoelectric ceramics, and the magnetic strain alloy is less likely to be damaged compared with the piezoelectric ceramics, and thus it can be used as the conversion device 1. In the magnetic strain alloy, the Ferro-cobalt alloy and the ferro-gallium alloy are preferable; in particular, the ferro-cobalt alloy has an efficiency of generating electricity higher ten times than the piezoelectric ceramics.

In order to raise the efficiency of generating electricity, the acoustic-electro conversion unit can further comprise other components besides the conversion device 1.

Figure 3:
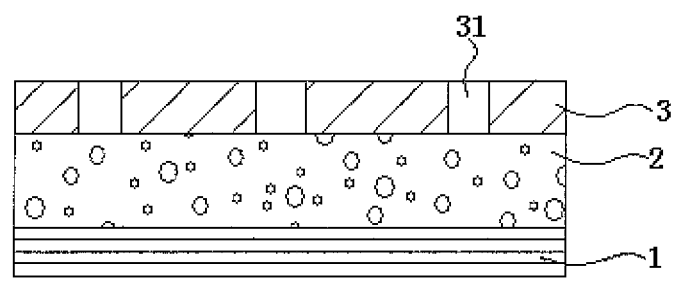
FIG. 3 is a schematic diagram of a profile structure of the acoustic-electro conversion unit of the mobile communication terminal according to the first embodiment of the present disclosure.

FIG. 3 is a schematic diagram of a profile structure of the sound-electric conversion unit of the mobile communication terminal according to the first embodiment of the present disclosure. As shown in FIG. 3, the acoustic-electro conversion unit can further comprise a sound collection device 3 configured to collect outside sound. Alternatively, the sound collection device 3 can comprise a sound collection board having a plurality of through holes 31. The through holes 31 on the sound collection board present a network distribution.

Since the conversion device 1 is arranged for example on a mobile phone, its area will not be too large. Since only vibration (sound) delivered to the conversion device 1 can be converted, how to make more vibration delivered to the conversion device 1 becomes a key to raise the efficiency of generating electricity.

For this purpose, as shown in FIGS. 2 and 3, the sound collection device 3 can be arranged in the mobile phone to collect outside sound. For example, the sound collection device 3 can be a board having the through holes 31 which present network distribution. When outside sound is conducted to the board, vibration of sound will be collectively delivered to the through holes 31, so as to function as collecting more outside sound, For example, the acoustic-electro conversion unit further comprises a conduction device 2 configured to generate vibration under the action of sound and conduct the vibration to the conversion device 1. In addition, the conduction device 2 can be a multi-hole sound-absorbing layer that is in contact with the conversion device 1.

Obviously, the conversion device 1 is solid while the outside sound is air vibration. Therefore, in order to implement the electricity generation, it has to convert air vibration into solid vibration (of the conversion device 1). However, the conversion device 1 is in general a thin film form, and will transmit the vibration of a large portion of sound back, that is, the rate of conversion from air vibration to solid vibration is not high. Therefore, the conversion device cannot sufficiently absorb the energy of the sound vibration, and thus the efficiency of generating electricity will correspondingly decrease.

For this reason, the sound vibration can be converted into the solid vibration through the conduction device 2 that can fully absorb the sound vibration, and then the solid vibration of the conduction device 2 can be conducted to the conversion device 1. Since vibration conduction of solids has a high efficiency, such manner is able to efficiently raise the efficiency of generating electricity. For example, the multi-hole material is a commonly used sound-absorbing material, and it can fully absorb the sound vibration through a large amount of inside small holes and convert the sound vibration into the solid vibration of its own. Therefore, as shown in FIGS. 2 and 3, the multi-hole sound-absorbing layer arranged between the conversion device 1 and the sound collection device 3 can be used as the conduction device 2. Alternatively, the above multi-hole sound-absorbing layer can be attached to the piezoelectric ceramics or the sound collection board.

Alternatively, the above acoustic-electro conversion unit (comprising the above conversion device 1, the conduction device 2/sound collection device 3 and so on) can be arranged at the back cover of the mobile phone.

As described above, the efficiency of generating electricity of the acoustic-electro conversion unit is closely related to the amount of the vibration received. Obviously, the larger the area of the acoustic-electro conversion unit is, the more the vibration amount to be receivable is. In the mobile communication terminal, the back cover opposite to the display panel is always a relatively large and smooth surface and does not comprise any other components generally, and thus it can just be used as a platform for arranging the acoustic-electro conversion unit. For example, the sound collection board can be used as a main body of the back cover of the mobile phone, and the inside of the sound collection board is arranged with the multi-hole sound-absorbing layer and the piezoelectric ceramics in sequence.

Of course, it is also feasible if the acoustic-electro conversion unit is arranged at other positions of the mobile communication terminal.

It can be understood that the above implementations are only exemplary implementations adopted for illustrating the principles of the present disclosure, but the present disclosure is not limited to them. Those skilled in the art can make various variations and improvements without departing from the spirit and essence of the present disclosure. These variations and improvements are also intended to be incorporated within the protection scope of the present disclosure.

The present application claims the priority of Chinese Patent Application No. 201310705385.7 filed on Dec. 19, 2013, full text of which is incorporated herein as part of the present invention by reference.

What is claimed is:

1. A mobile communication terminal, comprising:
   an acoustic-electro conversion unit configured to convert sound into electric energy, which includes a conversion device for converting vibration into electric energy; and
   an energy storage unit electrically connected to the conversion device, and configured to store electric energy generated by the conversion device,
   the acoustic-electro conversion unit further comprises:
   a conduction device configured to convert sound vibration into solid vibration, and conduct the solid vibration to the conversion device, and the conduction device is a multi-hole sound-absorbing layer that is in contact with the conversion device;
   a sound collection device configured to collect outside sound,
   wherein the sound collection device comprises a sound collection board having a plurality of through holes, the through holes on the sound collection board presenting a network distribution, when outside sound is conducted to the board, vibration of sound will be collectively delivered to the through holes, so as to function as collecting more outside sound.

2. The mobile communication terminal according to claim 1, wherein the conversion device comprises a piezoelectric ceramic thin film.

3. The mobile communication terminal according to claim 2, wherein the conversion device comprises a plurality of superposed piezoelectric ceramic thin films.

4. The mobile communication terminal according to claim 1, wherein the conversion device comprises a magnetic strain alloy thin film.

5. The mobile communication terminal according to claim 4, wherein the magnetic strain alloy thin film is a ferro-cobalt alloy thin film or a ferro-gallium alloy thin film.

6. The mobile communication terminal according to claim 2, wherein the mobile communication terminal is a mobile phone.

* * * * *